(12) United States Patent
Rozot et al.

(10) Patent No.: US 7,806,029 B2
(45) Date of Patent: Oct. 5, 2010

(54) APPARATUS AND METHOD FOR SHAPING SLABS OF MATERIAL

(75) Inventors: Thierry Rozot, Valparaiso, IN (US); Kenneth W. Wright, Naples, FL (US)

(73) Assignee: Edw. C. Levy Co., Detroit, MI (US)

( * ) Notice: Subject to any disclaimer, the term of this patent is extended or adjusted under 35 U.S.C. 154(b) by 506 days.

(21) Appl. No.: 11/454,555

(22) Filed: Jun. 16, 2006

(65) Prior Publication Data

US 2006/0283294 A1 Dec. 21, 2006

Related U.S. Application Data

(60) Provisional application No. 60/691,357, filed on Jun. 17, 2005.

(51) Int. Cl.
*B26D 1/00* (2006.01)
*B26D 5/00* (2006.01)
*B23D 36/00* (2006.01)
*G06F 19/00* (2006.01)
*B23K 7/00* (2006.01)
(52) U.S. Cl. .................. 83/13; 83/62; 83/365; 83/358; 700/174; 148/194
(58) Field of Classification Search ...................... 83/62, 83/DIG. 1, 365, 358–372, 15, 16, 22, 72, 83/73, 75.5, 76.8, 168, 170, 171, 177; 148/194–196, 148/202, 222; 700/174–178
See application file for complete search history.

(56) References Cited

U.S. PATENT DOCUMENTS 5,871,429 A * 2/1999 Harding et al. ............... 493/25

(Continued)

FOREIGN PATENT DOCUMENTS

FR 2799674 4/2001

(Continued)

OTHER PUBLICATIONS

Office Action dated Dec. 8, 2009 from the Canadian Patent Office (Appln 2609996).

(Continued)

*Primary Examiner*—Ghassem Alie
*Assistant Examiner*—Bharat C Patel
(74) *Attorney, Agent, or Firm*—Honigman Miller Schwartz and Cohn LLP

(57) ABSTRACT

A slab shaping system includes a slab shaping device. The slab shaping device includes a cutting device and de-burring device, wherein the cutting device and the de-burring device, respectively cut and de-burr a slab. According to an embodiment, the slab shaping system may include a plurality of spaced apart slab support beams that form at least one slot therebetween. According to an embodiment, the cutting device and de-burring device may be axially-aligned. A method for operating a slab shaping system is disclosed. The method includes the steps of positioning a plurality of slab support beams on a table to form at least one slot; positioning a slab over the slab support beams; positioning a cutting device and de-burring device of a slab shaping device in axial-alignment; and cutting and de-burring the cut in the slab along a length of the at least one slot.

10 Claims, 7 Drawing Sheets

U.S. PATENT DOCUMENTS

| | | | |
|---|---|---|---|
| 5,990,829 A * | 11/1999 | Garcia | 342/368 |
| 6,277,322 B1 | 8/2001 | Lotz et al. | |
| 6,334,906 B1 | 1/2002 | Donze et al. | |
| 6,722,250 B2 * | 4/2004 | Wagner et al. | 83/880 |
| 6,757,582 B2 * | 6/2004 | Brisson et al. | 700/186 |
| 6,772,040 B1 * | 8/2004 | Picard et al. | 700/166 |
| 6,787,731 B1 * | 9/2004 | Prioretti et al. | 219/121.44 |
| 6,819,974 B1 * | 11/2004 | Coleman et al. | 700/195 |
| 6,824,624 B2 * | 11/2004 | Prioretti et al. | 148/205 |
| 6,830,415 B2 * | 12/2004 | Shiba et al. | 409/131 |
| 6,882,434 B1 * | 4/2005 | Sandberg et al. | 356/601 |
| 6,889,585 B1 * | 5/2005 | Harris et al. | 83/62 |
| 7,062,334 B2 * | 6/2006 | Tanaka et al. | 700/69 |
| 7,270,527 B2 * | 9/2007 | Ide et al. | 425/174.2 |
| 7,378,051 B2 * | 5/2008 | Alexin | 266/61 |
| 7,450,247 B2 * | 11/2008 | Sandberg et al. | 356/601 |
| 2005/0067054 A1 * | 3/2005 | Alexin | 148/194 |
| 2005/0089949 A1 * | 4/2005 | Baer et al. | 435/40.5 |
| 2005/0199111 A1 * | 9/2005 | Sandberg et al. | 83/13 |

FOREIGN PATENT DOCUMENTS

JP  9122728  5/1997

OTHER PUBLICATIONS

Office Action dated Dec. 23, 2009 from the Australian Patent Office (Appln 2006259258).
Office Action dated Aug. 17, 2009 from the Australian Patent Office (Appln 2006259258).
Office Action dated Feb. 17, 2009 from the Australian Patent Office (Appln 2006259258).
European Examination Report for Application 06773391.5 dated Mar. 18, 2009.
Office Action dated Apr. 29, 2010 from European Patent Office for Application 06 773 391.5.

* cited by examiner

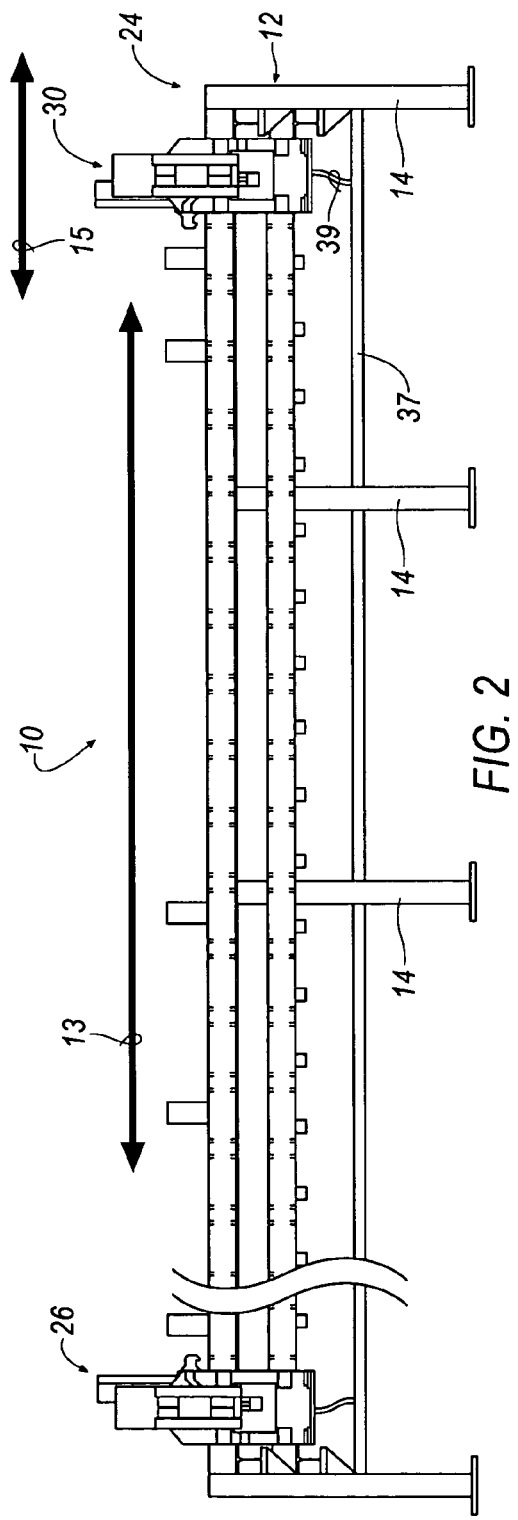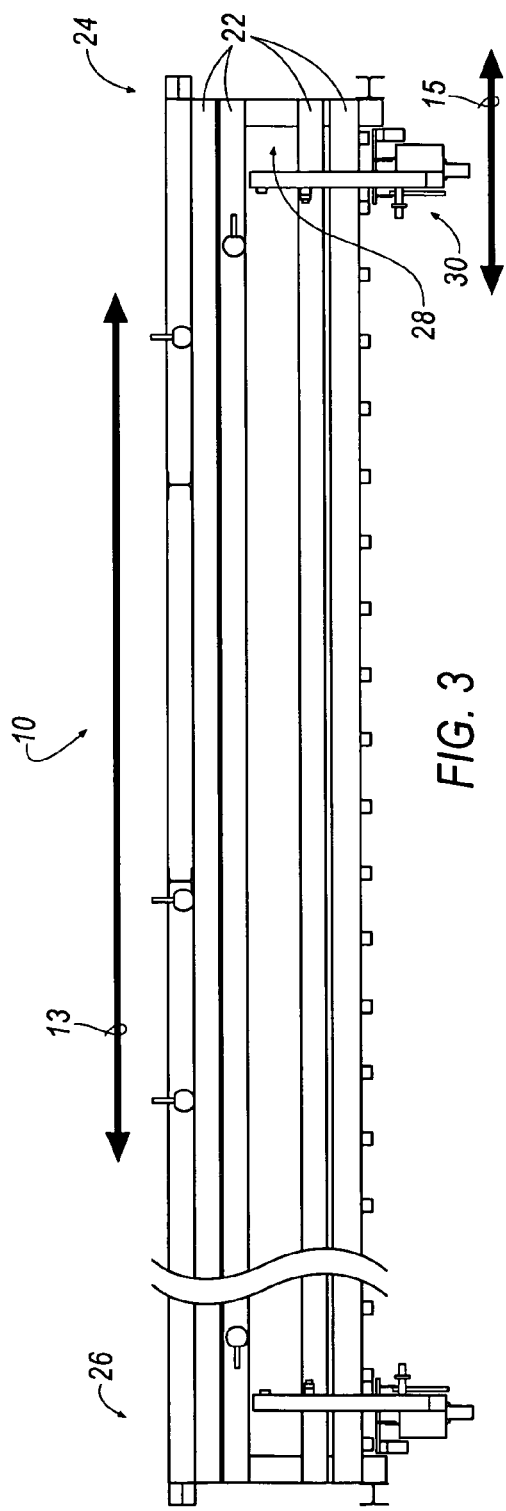

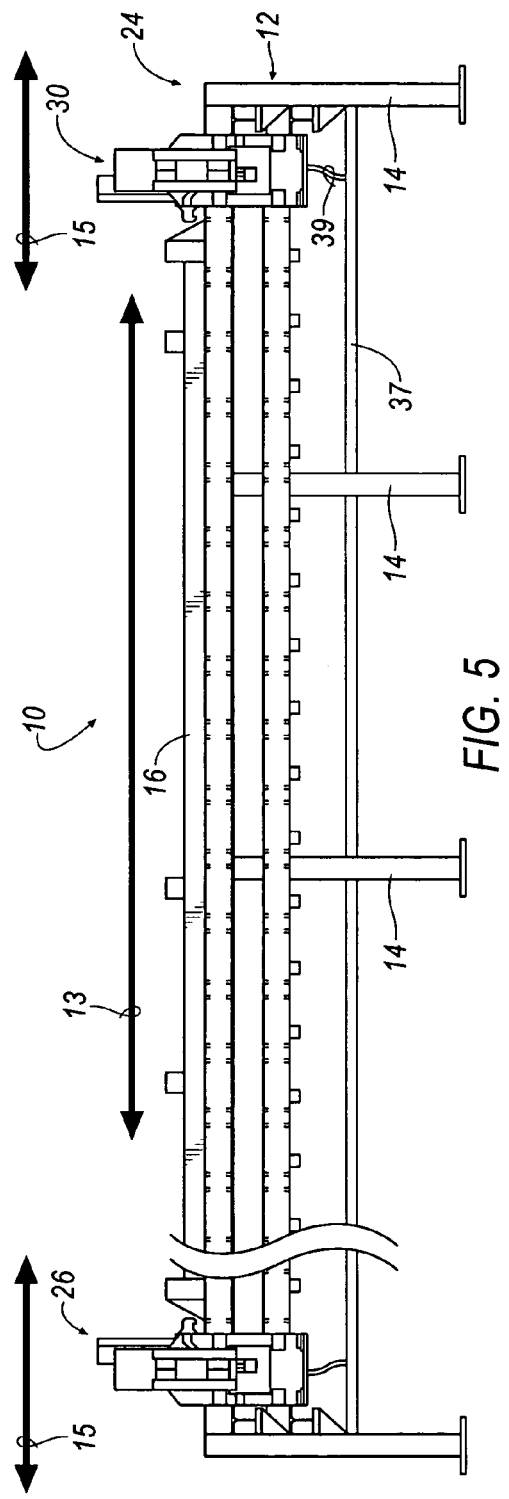
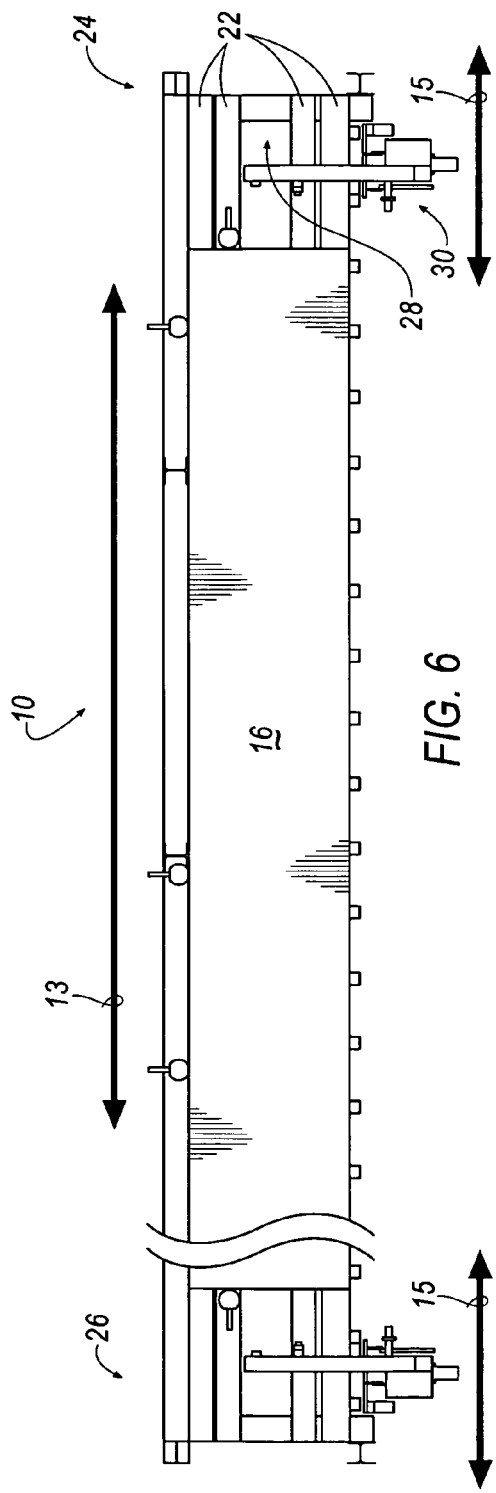

APPARATUS AND METHOD FOR SHAPING SLABS OF MATERIAL

CLAIM TO PRIORITY

This application claims the benefit of U.S. Provisional Application No. 60/691,357, filed Jun. 17, 2005, the contents of which are hereby incorporated by reference.

FIELD OF THE DISCLOSURE

The invention relates to an apparatus and method for shaping material.

BACKGROUND

Steel slabs of material are typically shaped using a variety of techniques (such as slitting, cutting, etc.) Cutting machines typically include fixed devices that must be reconfigured/replaced when the shape of the cut or the cut line change. Additionally, known cutting machines may accumulate harmful dross/waste product on or near the cutting machine during a cutting operation. As such, a need exists for an improved apparatus and method for shaping slab material that overcomes the drawbacks associated with known cutting machines/techniques.

SUMMARY

A slab shaping system includes a slab shaping device. The slab shaping device includes a cutting device and de-burring device wherein the cutting device cuts the slab and the de-burring device de-burrs the slab proximate the slab cut. According to an embodiment, the slab shaping system may include a plurality of slab support beams that form at least one slot. According to an embodiment, the cutting device and de-burring device may be axially-aligned and provides a cut and/or de-burrs the slab of material along a length of the at least one slot.

A method for operating a slab shaping system is disclosed. The method includes the steps of positioning a plurality of slab support beams on a table to form at least one slot, positioning a slab of material over the slab support beams; positioning a cutting device and de-burring device of a slab shaping device in axial-alignment; and providing a cut and de-burring the cut in the slab of material along a length of the at least one slot.

BRIEF DESCRIPTION OF THE DRAWINGS

Embodiments of the disclosure will now be described, by way of example, with reference to the accompanying exemplary drawings, wherein:

FIG. 2 is a left side view of a slab shaping system according to an embodiment;

FIG. 3 is a top view of a slab shaping system according to an embodiment;

FIG. 5 is a left side view of a slab shaping system according to an embodiment wherein a slab of material is positioned on the slab shaping system;

FIG. 6 is a top view of a slab shaping system according to an embodiment including a slab of material positioned on the slab shaping system;

DETAILED DESCRIPTION

Figure 1:
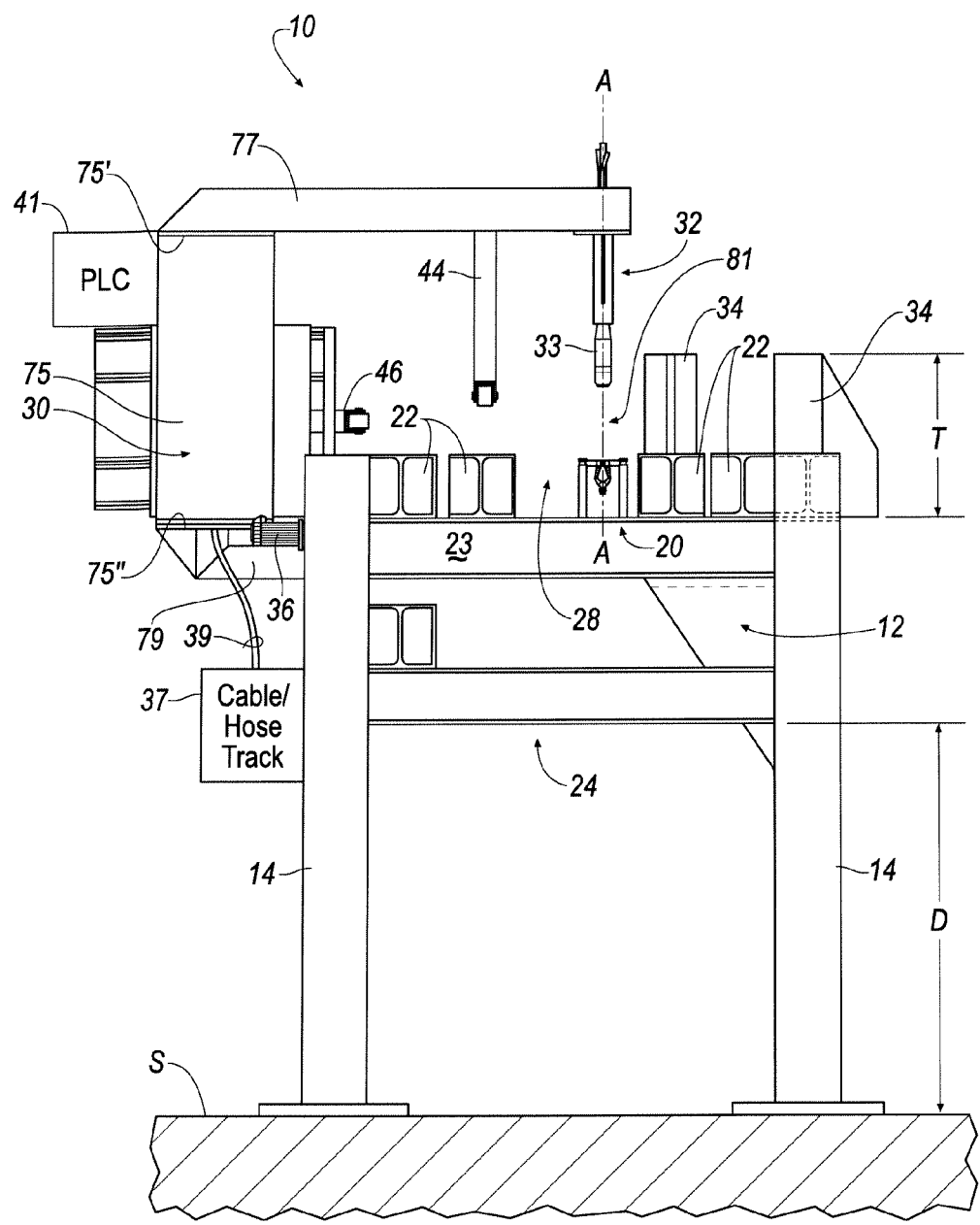
FIG. 1 is a front view of a slab shaping system according to an embodiment wherein no slab is present.

Referring now to the drawings, the preferred illustrative embodiments of the present disclosure are shown in detail. Although the drawings represent some preferred embodiments of the present disclosure, the drawings are not necessarily to scale and certain features may be exaggerated to more clearly illustrate and explain the present disclosure. Further, the embodiments set forth herein are not intended to be exhaustive or otherwise limit or restrict the disclosure to the precise forms and configurations shown in the drawings and disclosure in the following detailed description.

Figure 4:
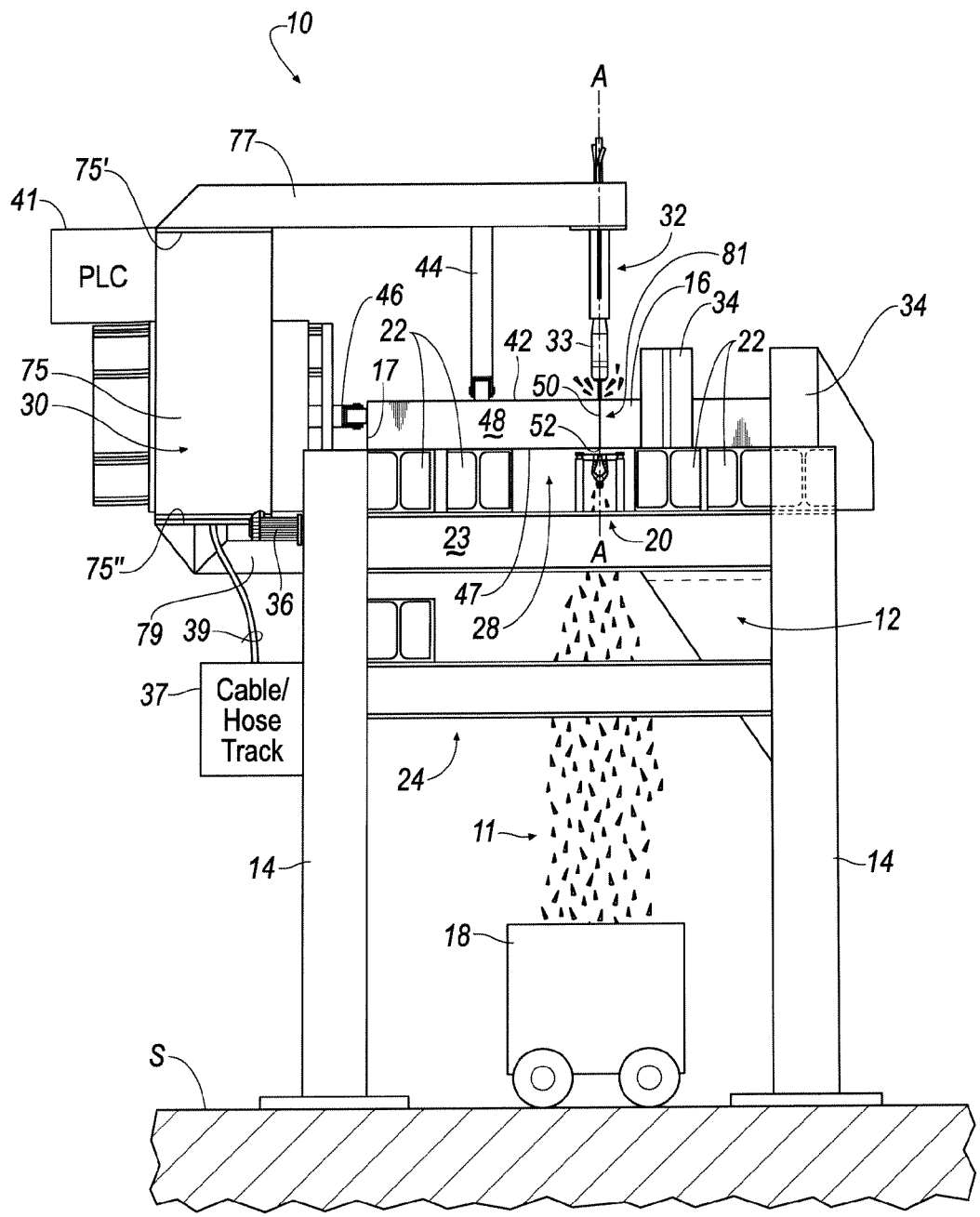
FIG. 4 is a front view of a slab shaping system according to an embodiment wherein a slab is present.

FIGS. 1-3 illustrate an embodiment of a slab shaping system, which is shown generally at 10. According to the illustrated embodiment, the slab shaping system 10 includes a table 12 supported on beams 14. The table 12 can be elevated at a distance, D, approximately equal to, for example, ten or more feet from an underlying surface, S. Among other things, the elevated distance, D, of the table 12 can provide one or more of the following benefits: (a) improved visibility for an operator/crane driver (e.g., when loading or unloading a slab of material 16—slab 16 not shown in FIG. 1) to/from the table 12, (b) efficient removal of dross/metallic waste 11 (e.g., slag removal system is represented in FIG. 4 by a wheeled cart 18) from underneath the table 12; and/or (c) the creation of an additional clearance underneath the table 12 for a slab de-burring device 20, which is referred to in the art as a "spyder." Although the slag removal system is depicted as wheeled cart 18, any removal system including conveyor belts or the like may be used. The slab of material 16 may include, but is not limited to slab steel. However, any material capable of being cut and de-barred can be processed by the present invention.

According to an embodiment, each table 12 includes two or more slab support beams 22 generally extending longitudinally between cross supports 23. Table 12 may include two or more cross supports 23 spaced between opposing end 24, 26 of the table 12. According to an embodiment, the slab support beams 22 may be positioned and spaced to define one or more slots 28 that may extend partially or fully from one end 24 to the opposite end 26 of the table 12. Slots 28 may be, for example, approximately fifteen inches wide. However, it will be appreciated that the slab shaping system 10 is not limited to a specific dimension or shape of the slots 28. De-burring device 20 may travel adjacent, proximate, under, over or within the slot 28.

The de-burring device 20 and a cutting device 32 are included as part of a slab shaping device 30. The slab shaping device 30, according to an embodiment, may travel fully or partially between ends 24, 26 of the table 12 along longitudinal table axis 13. This travel may be accomplished by way of a track system that couples device 30 to table 12. The slab shaping device 30 generally includes a U-shaped carriage which carries a de-burring device 20 and a cutting device 32. Because cutting device 32 and de-burring device 20 are coupled to a common U-shaped carriage, they move in unison along longitudinal axis 13. Referring to FIG. 1, the U-shaped carriage 30 includes a base body portion 75 having an upper distal end 75' and a lower distal end 75", a first arm 77 extending from the upper disal end 75' in a first direction, and a second arm 79 extending from the lower distal end 75" in the first direction. In an embodiment, the base body portion 75, the first arm 77 and the second arm 79 form the U-shaped carriage 30 to define a slab-receiving channel 81. Referring to FIG. 4, the slab 16 is arranged relative the U-shaped carriage 30 such that the slab 16 is positioned within the slab-receiving channel 81. With reference to FIGS. 1 and 4, in an embodiment, the cutting device 32 is coupled to the first arm 77 and extends from the first arm 77 in a second direction that is substantially orthogonal/perpendicular to the first direction for directing the cutting device 32 toward the upper face surface 42 of the slab 16 for cutting a slit 50 through the slab 16 from the entrance face formed by the upper face surface 42 of the slab 16 to the exit face formed by the lower, support surface 47 of the slab 16. The de-burring device 20 is coupled to the second arm 79 and extends from the second aim 79 in a third direction that is substantially orthogonal/perpendicular to the first direction for directing the de-burring device 20 toward the lower, support surface 47 of the slab 16. In an embodiment, the third direction is substantially opposite the second direction.

As seen in FIG. 4, the cutting device 32 provides a means 33 for slitting or cutting 50 slab 16. The slit or cut 50 may partially or fully extend into the slab 16. The means 33 may include, but is not limited to a water saw, cutting torch, laser cutting tool, rubber wheel, or the like. According to an embodiment, cutting device 32 may, in some embodiments, be referred to as a torch and the slab shaping device 30 may, in some embodiments, be referred to as a torch carriage U-frame (TCUF).

As illustrated in FIG. 4, a shaping axis, A-A, may pass through the de-burring device 20, cutting device 32, and along the slit or cut 50 in the slab of material 16. Although the illustrated embodiment may include a shaping axis, A-A, extending through the de-burring device 20 and cutting device 32, it will be appreciated that the slab shaping system 10 is not limited to include this axial arrangement nor is it limited to include a de-burring device 20 and cutting device 32.

According to an embodiment, table 12 may further include toes 34 that extend from the table 12 at a distance, T (FIG. 1). One or more toes 34 can be used to assist an operator/crane driver in positioning of slab 16 on the table 12. According to an embodiment, the toes 34 may extend to a distance, T, for example, approximately eighteen inches above a top surface of table 12. Further, the slab shaping system 10 and associated slab shaping device 30 does not require a slab 16 to reside against one or more of the toes 34 in order for the slab shaping device 30 to cut from one end 24, 26 to another end 24, 26 along an edge 17 of the slab of the material 16. Therefore, if desired, the toes 34 may be used primarily or solely for guiding the operator/crane driver.

According to an embodiment, service supply lines 39 (such as those carrying water, oxygen, gas, electricity, compressed air, or the like) may be transported along the length of the table 12, for example, by a cable track system 37. Further, control regulators and solenoid valves may, if desired, be located proximate the slab shaping device 30. According to an embodiment, a "home position" of the slab shaping device 30 may permit access for maintenance purposes. If desired, numerous tables 12 can be grouped together and a common control center ("pulpit") can be located between tables 12. For example, according to an embodiment, a pulpit can be included between each block of four tables 12. The pulpit can be used to house, for example, a computer terminal, printer, programmable logic controller (PLC) and/or a labeling machine.

Figure 7A:
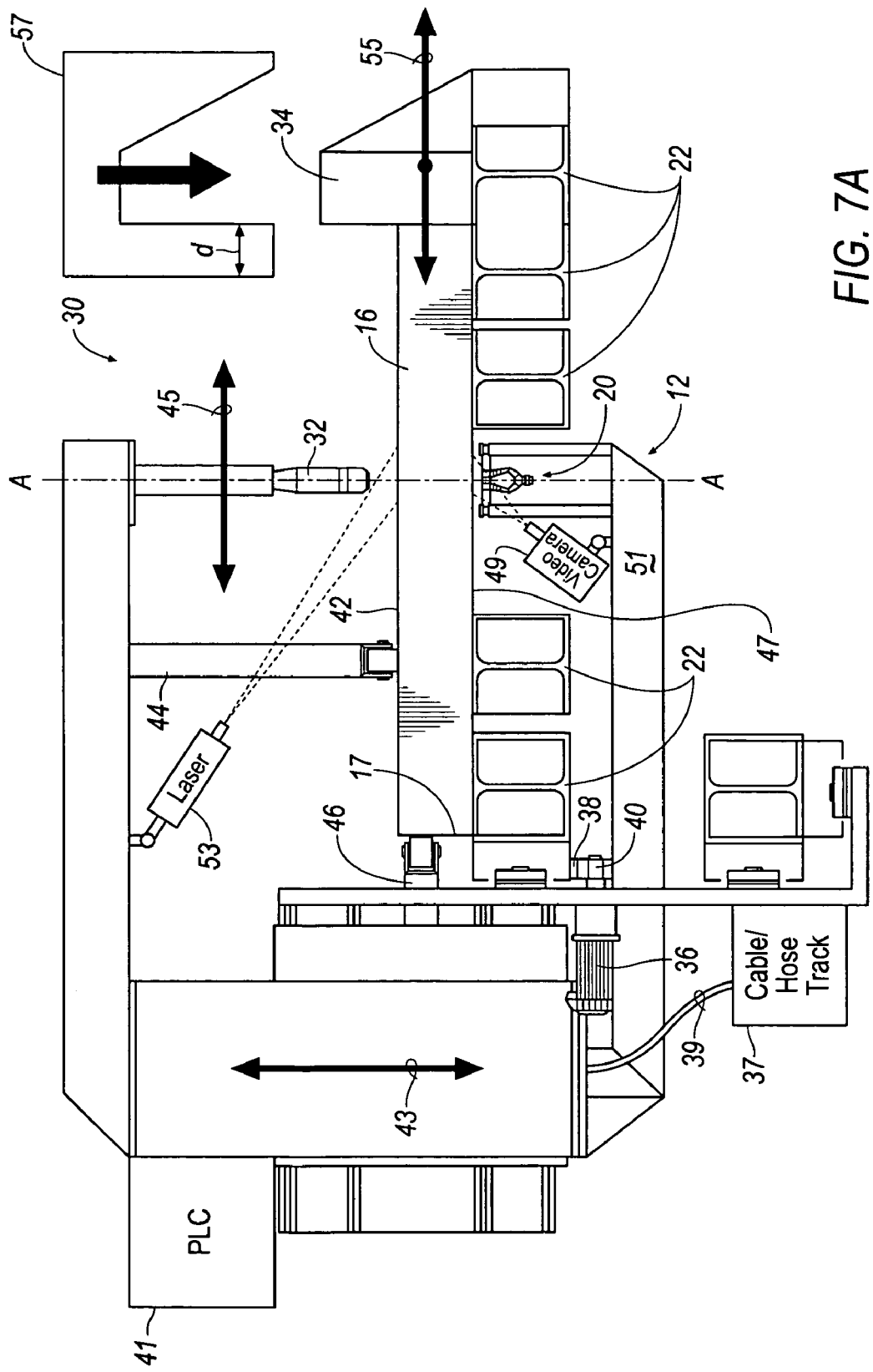
FIG. 7A is a front view of a slab of material and a slab shaping device of a slab shaping system according to an embodiment.
Figure 7B:
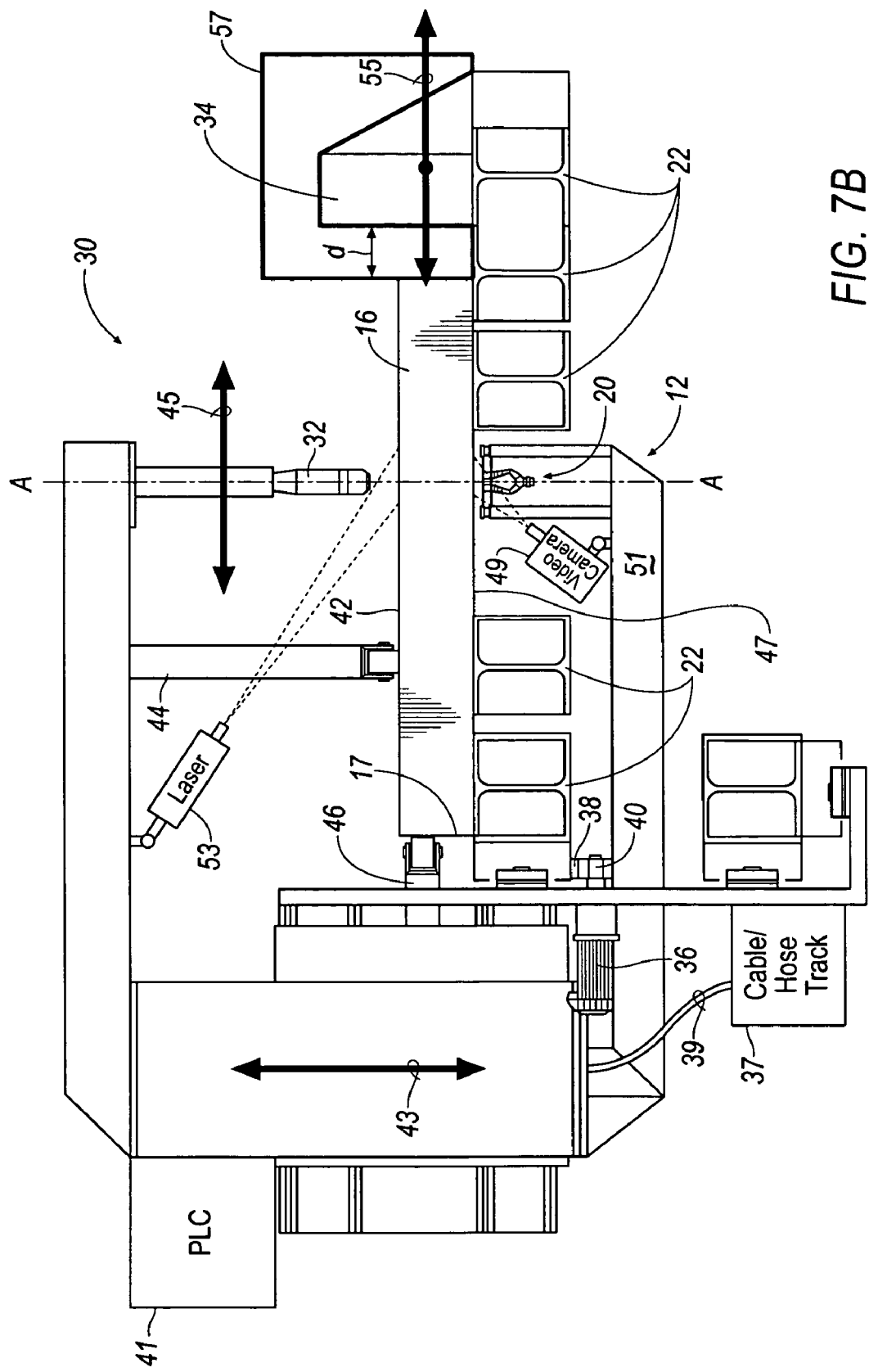
FIG. 7B is an embodiment of the system of FIG. 7A, wherein a capping toe is functionally positioned to offset the position of the slab.
Figure 8:
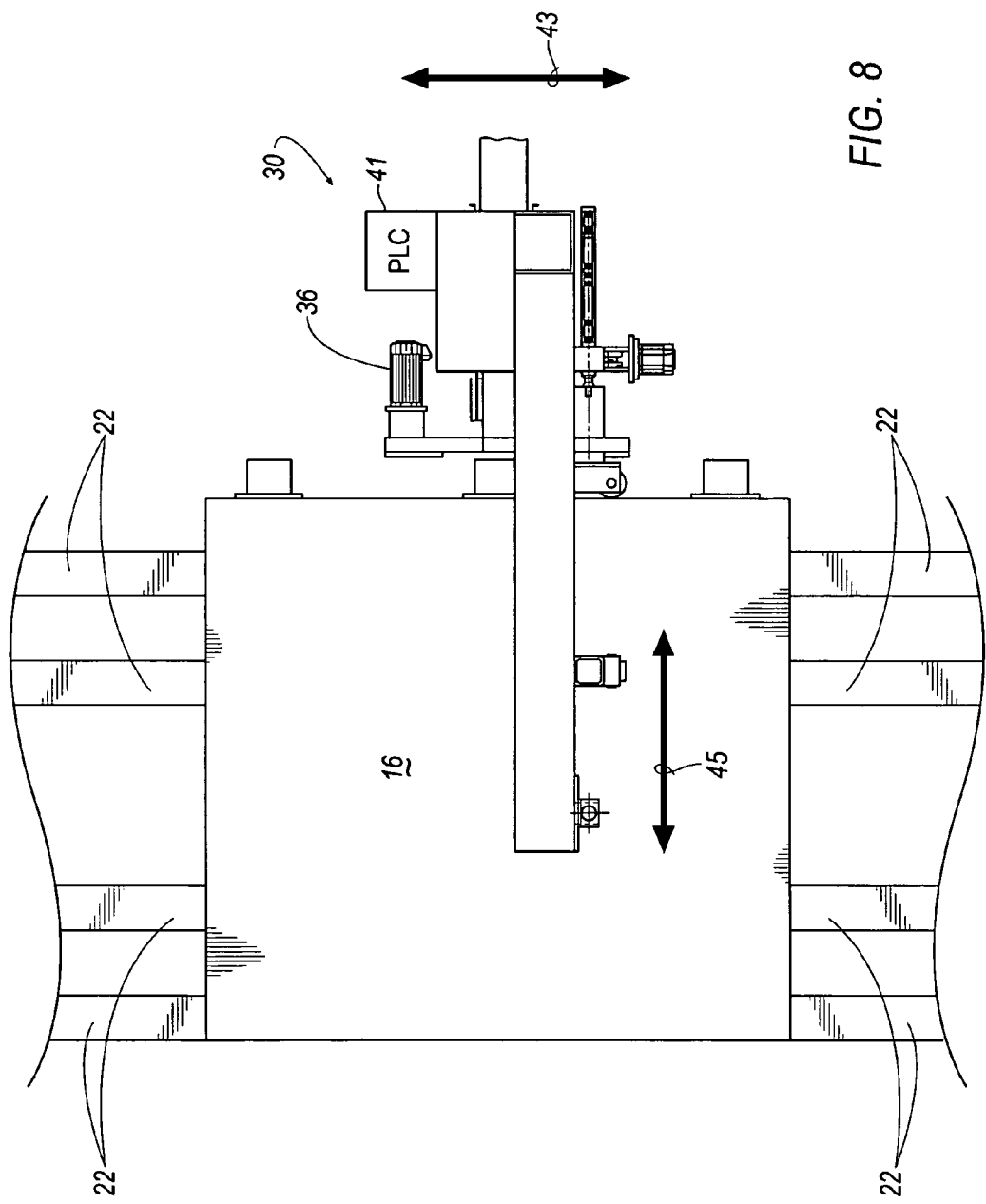
FIG. 8 is a top view of a slab of material and a slab shaping device of a slab shaping system according to an embodiment.

FIGS. 7 and 8 illustrate, an end and top view of the slab shaping device 30. The cutting device 32 and de-burring device 20 of the slab shaping device 30 can be adapted and configured to travel longitudinally (e.g., lengthways) along the table 12 and slab 16. If desired, the cutting device 32 and de-burring device 20 may be rigidly located (and, if desired, permanently located) in operational communication with one another along the shaping axis, A-A, so as to be substantially in an opposing operational alignment. Accordingly, the slab shaping system 10 permits, inter alia, the ability to accurately align an associated cutting device 32 and de-burring device 20, regardless of where a slab 16 is positioned. This alignment permits both device 32 and device 20 to travel in a substantially "perfect" line along the shaping axis, A-A. Alternatively, selected portions of the slab shaping device 30 may be manipulated by a motor 36, such as, for example, an electric motor. Moreover, the slab shaping system 10 may include various coordinated-movement features, accomplished by using, for example, a rack 38 and pinion 40 assembly coupled to motor 36 and controlled by PLC 41.

According to an embodiment, the up/down 43 and/or in/out 45 motion of slab shaping device 30 may be controlled by a PLC 41. Motion 43 and 45 may be orthogonal. Such controlled movements of the slab shaping device 30 can, among other things, ensure that the cutting device 32 is in a desired position relative a particular surface of a slab 16 at all times during cutting. For instance, if a surface of slab 16 is bowed, the cutting device 32 may be moved up or down 43 (as it longitudinally traverses slab 16) to maintain a preferred cutting distance from an upper face 42 of slab 16 and also to ensure that the de-burring device 20 maintains a preferred position with respect to a lower face 47 under slab 16. Other associated positional or relevant information can be detected by indexing arm 44 and/or laser 53 and sent to PLC 41 or any other controller, or network of controllers. If desired, an in/out 45 motion of the slab shaping device 30 can also be fully controlled by a controller, for example, PLC 41.

According to an embodiment, when slab 16 is on the table 12, the slab shaping device 30 may be moved to a "cutting and/or de-burring position." Upon contacting an edge 17 of the slab of material 16 by a horizontal slab shaping device indexing arm 46, the cutting device 32 and de-burring device 20 may be positioned to a desired cutting and/or de-burring position. As slab 16 is being cut, the slab shaping device 30 can travel both along the length of the slab of material 16, and also latitudinally 45. Latitudinal movement of device 30 allows device 30 to move parallel to an edge of slab 16 even if slab 16 is not placed parallel to toes 34.

Latitudinal movement 45 of both device 32 and 20 can be accomplished through two respectively associated movement mechanisms whose movement is coordinated by a central controller (e.g. PLC 41). Or, alternatively, the longitudinal movement 45 of devices 32 and 20 may be accomplished by moving shaping device latitudinally 45. These types of movement mechanisms are well-known to those skilled in the art.

Although the slab shaping system 10 as illustrated show one cutting device 32 and one de-burring device 20, it will be appreciated that the slab shaping system 10 may include more than one cutting device 32 and/or more than one de-burring device 20. For example, if more than one cutting device 32 and de-burring device 20 are included, the more than one cutting device 32 and de-burring device 20 may be arranged on the slab shaping device 30 in any desirable configuration or orientation.

For example, the movement between a pair of the cutting devices 32 (each with a respective, axially-aligned de-burring device 20) can be utilized to shape a slab of material 16. In an embodiment, the cutting devices 32 can start cutting slab 16 at opposite ends of slab 16. The cutting devices 32 may commence cutting slab 16 concurrently, or, in various programmable, timed patterns, towards one another over the length of slab 16. According to an embodiment, before the cutting devices 32 contact one another (or "meet") at a point along the length of the slab of material 16 (which can be, for example, the middle of the length of the slab of material 16), one of the cutting device 32 can be sufficiently retracted or withdrawn (such as by returning to a start position) to permit the other cutting device 32 to complete the desired cut.

According to an embodiment, the associated PLC can be an ALLEN-BRADLEY® PLC, although it will be appreciated that one or multiple other programmable logic controllers may be used. Various control parameters (inputs and outputs) must be accounted for and controlled. Some parameters may include ignition of the cutting device 32, "seeking the slab edge," preheat time, acceleration curves, deceleration curves, cutting device off/on, regulation of cutting speed. These parameters can be controlled by PLC 41 or in other software or hardware based controllers.

The slab shaping system 10 of the present invention may further optionally include any or all of the following features: (a) laser distance/position measurement systems 53 (which can, for example, measure one or more slab parameters (e.g., measure the length or surface contour of the slab 16)), (b) On/Off control of the cutting device 32, including those using an ignition system, (c) SPC data and, if desired, an indirect or direct connection with computer networks or computer systems (e.g., computer systems connected by digital communication network (e.g. Ethernet)); (d) emergency stop controls; (e) fully or semi-automatic system operations controlled remotely, such as by a remote-control, hand-held device, or the like; (f) various control procedures, including: (1) prohibiting an operator from cutting a slab of material 16 if data has not been sorted and properly transferred/confirmed; (2) prohibiting the slab shaping device 30 from cutting without a required identification of a slab of material 16; (3) prohibiting cutting of a slab of material 16 if the cutting device 32 is in a non-validated position; (4) if desired, in operation, removing slabs of material 16 from the table 12 and transferring the slabs of material 16 to outgoing cells; (5) building piles of slabs of material 16 in which all slit edges are on the same side; and (6) providing two operators for some applications.

Further, for quality control purposes, one or more digital video cameras 49 or other visioning devices may be positioned in connection with each cutting station. These one or more visionary devices may be stationed on moving arm 51. Arm 51 substantially follows the exit cut line of the slab and/or the de-burring device 20 across the length of the slab of material 16 to capture, in digital video form, the image along the complete length of the slab of material 16 where the exit cut line is formed on the exit face 47 of the slab 16. Once captured in video format, each cutting process end result can be digitized and displayed on a video monitor (e.g., in a crane operators cabin or pulpit), or transferred and/or stored on a computer network so persons can view and archive the quality and character of the slab's exit cut line. The operator can, among other things, control the speed of the video (slower or faster) as the video image collection takes place along the length of the cut. This image data allows an operator to visually inspect one or more characteristics associated with the exit slit or cut line 52 across the length of the slab 16 (such as abnormalities or imperfections) created during the cutting and/or de-burring process. If an undesirable characteristic is found by viewing the video information, a crane operator can divert that slab 16 to a slab yard area where the defect can be further inspected and/or corrected. Imperfections (as manifested by the image data) can be screened by a human operator, or various vision recognition software systems can be used to computer automate the quality screening process.

According to an embodiment, the digital representation of video data can be viewed by a crane operator or an operator of the system (e.g., on the floor) by way of a monitor or terminal, such as a hand-held device or a terminal screen, before or during the unloading process. If a defect is observed or detected, the associated slab of material 16 can be moved, for example, by a crane, to a nearby area for visual inspection or defect correction. Such inspection or correction may include manual means or processes.

Now referring to FIGS. 7A and 7B, toes 34 have been described herein as members that are essentially fixed to table 12. Although this arrangement is satisfactory for some applications, it may be desirable to position toes 34 along an axis 55 that is essentially parallel to a top surface of slab support beams 22. By allowing toes 34 to be adjusted along axis 55, the position of slab 16 can be manipulated without adjusting cutting device 32 along axis 45. Toes 34 can be adjusted along axis 55 by any type of mechanical/hydraulic/or other actuator well-known to those skilled in the art. The movement of toes 34 along axis 55 may be controlled by one or more controllers, such as, for example, PLC controller 41. Although mechanisms can be added to move toes 34 along axis 55, such mechanisms add to the complexity of the overall invention. In instances where automated means to move 55 toes 34 are not practical, a similar effect can be obtained by fabricating a capping toe 57 that is designed to engage a respectively associated toe 34 (FIG. 7B). The capping toe 57 is adapted to positively engage toe 34 such that capping toe 57 will not be dislodged by the frictional engagement of slab 16 during normal operation. By engaging capping toe 57 to toe 34, an offset "d" is established. Thereafter, any slab that is placed on table 12 will necessarily be displaced by a distance "d." Thus, capping toe provides a simple but yet effective, means for offsetting a slab with respect to toe 34. Although capping toe 57 is shown as manipulatable from the top of toe 34, it is contemplated within the scope of this invention that capping toe 57 may be elevatable from below toe 34. Also, capping toe 57 can be manipulatable using human intervention or, simple drive mechanisms, well-known to those skilled in the art, may be used to manipulate capping toe 57 into, and out of, its offset position.

The present invention has been particularly shown and described with reference to the foregoing embodiments, which are merely illustrative of the best mode or modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method for operating a slab shaping system that cuts and de-burrs a slab, wherein the slab includes a plurality of face surfaces including at least an upper face surface and a lower, support surface, wherein the upper face surface forms an entrance face of the slab and the lower, support surface forms an exit face of the slab, comprising the steps of:
   positioning a plurality of slab support beams on a table to form at least one slot therebetween;
   positioning the lower, support surface of the slab adjacent the slab support beams;
   locating a U-shaped carriage proximate the slab, wherein the U-shaped carriage includes a base body portion, wherein the U-shaped carriage is formed by
      extending a first arm from an upper distal end of the base body portion in a first direction, and
      extending a second arm from a lower distal end of the base body portion in the first direction, wherein the base body portion, the first arm and the second arm form the U-shaped carriage to define a slab-receiving channel;
   arranging the slab relative the U-shaped carriage such that the slab is positioned within the slab-receiving channel;
   providing a cutting device that is coupled to the first arm for positioning the cutting device opposite the upper face surface of the slab;
   providing a de-burring device that is coupled to the second arm for positioning the de-burring device opposite the lower, support surface of the slab, wherein the de-burring device extends away from the second arm and is located within the at least one slot formed by the table;
   utilizing the cutting device positioned opposite the upper face surface of the slab for cutting a slit through the slab from the entrance face formed by the upper face surface of the slab to the exit face formed by the lower, support surface of the slab, wherein the slit forms an exit cut line on the exit face, and
   utilizing the de-burring device for de-burring the exit face of the slab proximate a location of the exit cut line formed by the slit at the exit face, wherein the cutting and de-burring steps are permitted to be conducted during a manipulation of one or more of an up/down and in/out spatial orientation of the base body portion that commonly carries both of the first arm coupled to the cutting device and the second arm coupled to the de-burring device relative the slab for adjustably- and correspondingly-maintaining spacing between the cutting device and the upper face surface of the slab as well as the de-burring device and the lower, support surface of the slab, wherein the manipulation of one or more of the up/down and the in/out spatial orientation of the base body portion includes selective movement of the base body portion in a direction that is substantially orthogonal with respect to the upper face surface and the exit face surface of the slab, wherein the substantially orthogonal movement of the base body portion results in a corresponding orthogonal movement, in unison, of the cutting device and the de-burring device relative the slab.

2. The method according to claim 1, further including the steps of:
   determining an identification of the slab material; and
   prohibiting the cutting device from cutting the slab in an absence of a determination of the identification of the slab material.

3. The method according to claim 1, further including the steps of:
   determining if the cutting device is in a non-validated position; and
   prohibiting the cutting device from cutting the slab if the cutting device is in the non-validated position.

4. The method according to claim 1, further including the steps of:
   providing a quality control device that includes the positioning of one or more visioning devices upon a moving arm;
   imaging one or more of the entrance face and the exit face; and
   displaying at least one characteristic of said slit that was cut through the slab from the entrance face to the exit face.

5. The method according to claim 4, wherein the one or more visioning devices includes an imaging camera, wherein the method further includes the steps of:
   moving the imaging camera along the exit cut line formed by the slit by
      causing the moving arm to follow the de-burring device.

6. The method according to claim 4, further including the step of:
   digitizing the image; and
   analyzing at least one characteristic of said exit cut line formed by the slit using automated vision recognition software for
      detecting one or more abnormalities and imperfections associated with the exit cut line for
         correcting the one or more abnormalities and imperfections associated with the exit cut line.

7. The method according to claim 1, wherein the slab is formed to be:
   a substantially non-planar, bowed slab, wherein the manipulation of the up/down spatial orientation of the U-shaped carriage relative the substantially non-planar, bowed slab is controlled by a programmable logic controller for providing the ability to adjustably-maintain the spacing between:
      the cutting device and the upper face surface of the slab as well as
      the de-burring device and the lower, support surface of the slab when the U-shaped carriage is utilized for cutting and de-buring the substantially non-planar, bowed slab.

8. The method according to claim 1, further comprising the step of:
   utilizing a laser distance/position measurement system to determine a surface contour of the slab.

9. The method according to claim 1, wherein the first arm extending from the upper distal end of the base body portion in the first direction is arranged substantially parallel with respect to the upper face surface of the slab, wherein the second arm extending from the lower distal end of the base body portion in the first direction is arranged substantially parallel with respect to the lower, support surface of the slab.

10. The method according to claim 1, wherein the first arm extending from the upper distal end of the base body portion in the first direction does not traverse any portion of a thickness of the slab, wherein the second arm extending from the lower distal end of the base body portion in the first direction does not traverse any portion of the thickness of the slab.

* * * * *